(12) United States Patent
Kiesewetter et al.

(10) Patent No.: US 9,090,148 B2
(45) Date of Patent: Jul. 28, 2015

(54) CONVERTIBLE TOP HAVING A FABRIC OUTER SKIN

(75) Inventors: Frank Kiesewetter, Germering (DE); Jan Wököck, Bad Aibling (DE); Thomas Dintner, München (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 14/119,769

(22) PCT Filed: Jun. 5, 2012

(86) PCT No.: PCT/EP2012/060599
§ 371 (c)(1),
(2), (4) Date: Jan. 22, 2014

(87) PCT Pub. No.: WO2012/168240
PCT Pub. Date: Dec. 13, 2012

(65) Prior Publication Data
US 2014/0159418 A1    Jun. 12, 2014

(30) Foreign Application Priority Data
Jun. 9, 2011    (DE) .................. 10 2011 103 796

(51) Int. Cl.
*B60J 7/12*    (2006.01)
*B32B 25/10*    (2006.01)
(Continued)

(52) U.S. Cl.
CPC .................. *B60J 7/1226* (2013.01); *B32B 3/12* (2013.01); *B32B 5/024* (2013.01); *B32B 25/10* (2013.01); *B32B 27/40* (2013.01); *B32B 29/002* (2013.01);
(Continued)

(58) Field of Classification Search
CPC ....... B60J 1/1823; B60J 7/143; B32B 29/002; B32B 2605/003; B32B 2605/08
USPC .......... 296/100.15, 107.09, 107.16, 219, 210
See application file for complete search history.

(56) References Cited

U.S. PATENT DOCUMENTS 3,381,996 A * 5/1968 Horan ........................... 296/219
4,606,573 A * 8/1986 Schneider ..................... 296/210
(Continued)

FOREIGN PATENT DOCUMENTS

DE          89 09 984       10/1989
DE          101 58 364 A1   6/2003
(Continued)

OTHER PUBLICATIONS

International Search Report in PCT/EP2012/060599, dated Aug. 17, 2012 with English language translation.
(Continued)

*Primary Examiner* — Pinel Romain
(74) *Attorney, Agent, or Firm* — Fitch, Even, Tabin & Flannery, LLP

(57) ABSTRACT

The invention relates to a convertible top, comprising a top linkage, which can be moved between an open position that opens the vehicle interior upward and a closed position that covers the vehicle interior above and which as a link assembly on both sides with respect to a vertical vehicle longitudinal center plane, and at least one top element that is at least largely rigid, which top element extends between the link assemblies arranged on both sides. The top element is designed as a plastic composite component that comprises a substrate structure, which is formed on an outer skin that is made of a textile material having a rubber back lining.

8 Claims, 5 Drawing Sheets

(51) Int. Cl.
*B60J 7/14* (2006.01)
*B32B 5/02* (2006.01)
*B32B 27/40* (2006.01)
*B32B 29/00* (2006.01)
*B32B 3/12* (2006.01)

(52) U.S. Cl.
CPC ............ *B60J 7/143* (2013.01); *B32B 2605/003* (2013.01); *B32B 2605/08* (2013.01)

(56) References Cited

U.S. PATENT DOCUMENTS

| | | | |
|---|---|---|---|
| 5,147,713 A * | 9/1992 | Dalbec et al. | 442/164 |
| 5,385,774 A * | 1/1995 | Cramer et al. | 442/229 |
| 6,499,797 B1 * | 12/2002 | Bohm et al. | 296/191 |
| 7,128,365 B2 * | 10/2006 | Kiesewetter et al. | 296/191 |
| 7,351,672 B2 * | 4/2008 | Johnson et al. | 442/261 |
| 8,042,864 B2 * | 10/2011 | Schleiermacher et al. | 296/210 |
| 2004/0155479 A1 * | 8/2004 | Willard | 296/107.01 |
| 2006/0076797 A1 * | 4/2006 | Gandemer et al. | 296/107.01 |
| 2011/0101731 A1 * | 5/2011 | Legler et al. | 296/181.2 |
| 2012/0164367 A1 * | 6/2012 | Delmas | 428/85 |

FOREIGN PATENT DOCUMENTS

| | | |
|---|---|---|
| DE | 102 37 090 B4 | 8/2006 |
| DE | 10 2008 009 431 A1 | 8/2009 |
| DE | 10 2008 028 667 A1 | 12/2009 |
| DE | 10 2008 033 923 A1 | 1/2010 |
| DE | 10 2008 058 349 A1 | 5/2010 |
| DE | 10 2008 064 257 A1 | 6/2010 |
| DE | 10 2009 013 278 A1 | 9/2010 |
| EP | 2 439 092 A2 | 4/2012 |
| WO | WO 2005102697 A1 * | 11/2005 ............. B32B 27/40 |
| WO | 2010006718 A1 | 1/2010 |

OTHER PUBLICATIONS

International Preliminary Report and Written Opinion in PCT/EP2012/060599 dated Dec. 27, 2013 (English language translation).

* cited by examiner

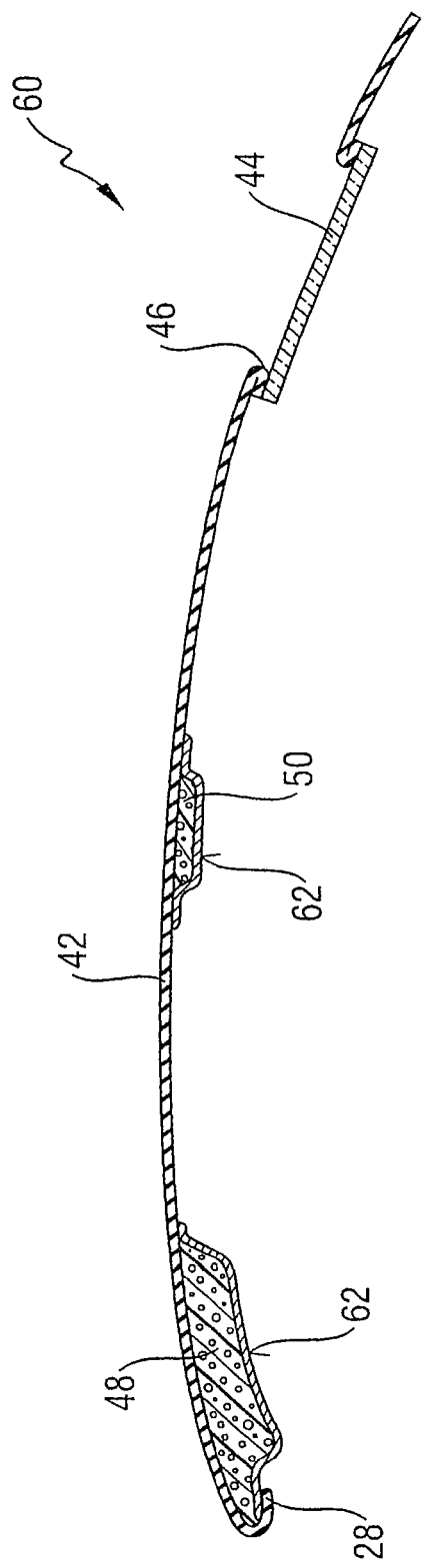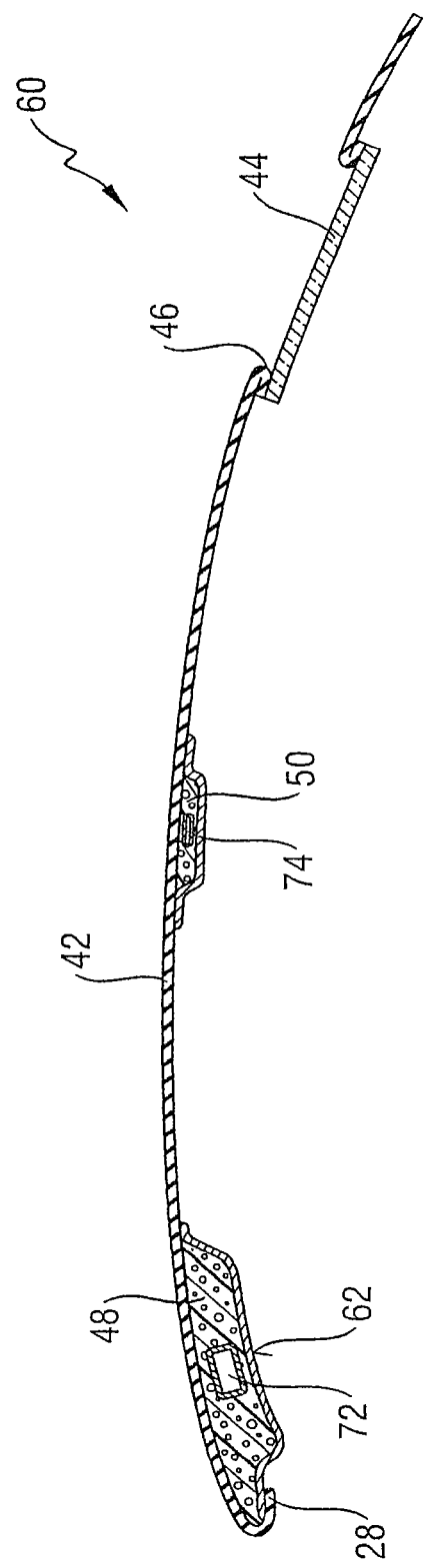

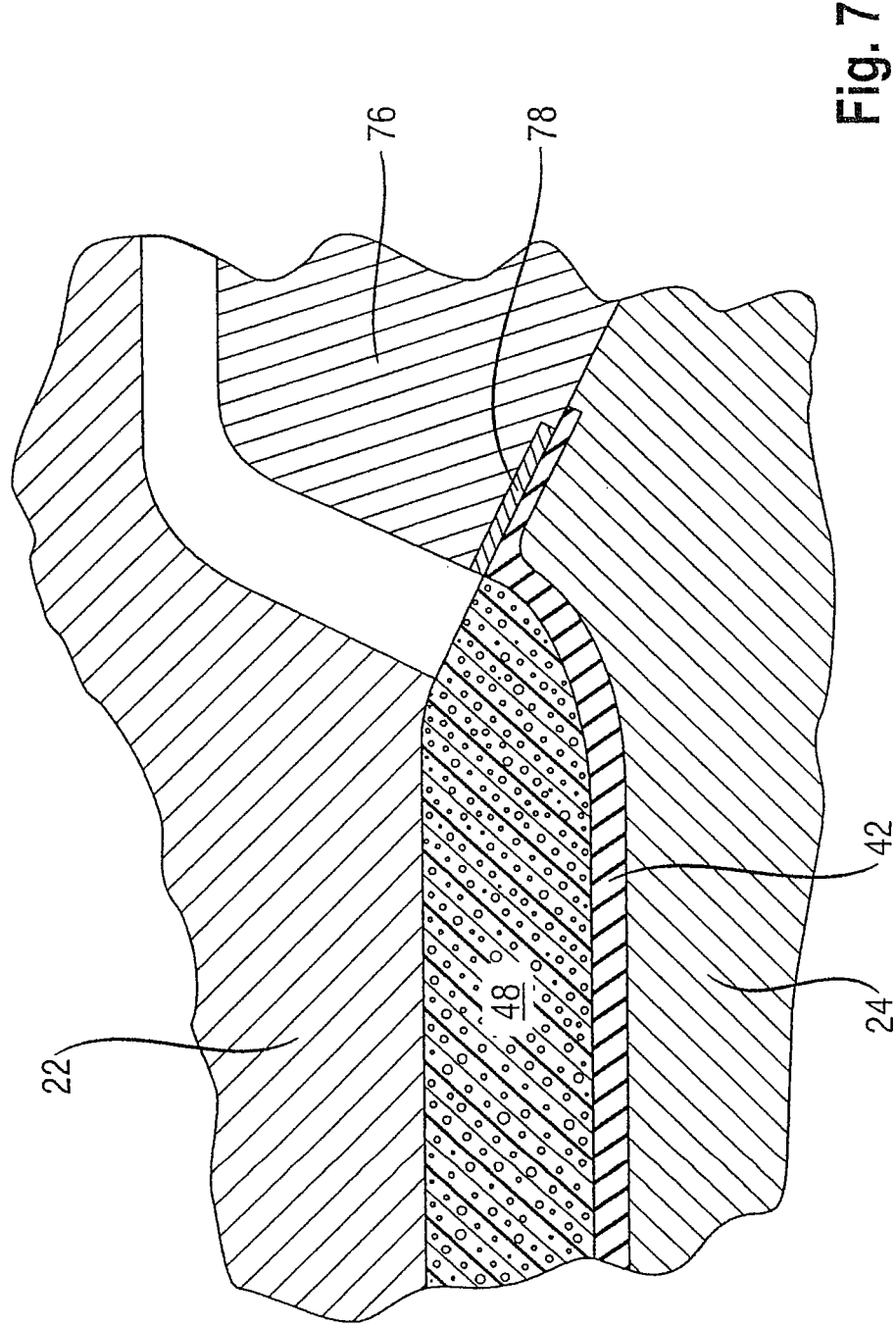

CONVERTIBLE TOP HAVING A FABRIC OUTER SKIN

CROSS REFERENCE TO RELATED APPLICATIONS

This application is a U.S. National Phase application of International Application No. PCT/EP2012/060599, filed Jun. 5, 2012, which claims benefit of the priority date of German Application 10 2011 103 796.2, filed Jun. 9, 2011, which are hereby incorporated herein by reference in their entirety.

The invention relates to a convertible top having the features of the preamble of claim 1.

Such convertible tops are known from practical experience and comprise a top linkage which is able to be moved between an open position which opens the vehicle interior upward and a closed position which covers the vehicle interior above. The top linkage has a link assembly on both sides with respect to a vertical vehicle longitudinal center plane. Depending on the design of the top, the top linkage either serves for stretching a foldable top fabric or for storing and moving rigid roof segments which in the closed position of the top linkage form a hard top of the relevant motor vehicle. When designing the top with a foldable top fabric, cross supports generally extend between the link assemblies arranged on both sides, the top fabric being fastened to said cross supports.

Moreover, a vehicle body part which may be configured as a mobile vehicle element and constitutes a composite component is disclosed in the publication DE 102 37 090 B4. Said vehicle body part comprises a substrate structure configured as a sandwich construction, which comprises a paper honeycomb which is arranged between two layers consisting of a polyurethane glass-fiber mixture. On one side facing the vehicle exterior, an outer skin is arranged on the substrate structure, said outer skin being able to be configured as a deep-drawn plastics part and forming the visible surface of the relevant body part.

The object of the invention is to provide a convertible top of the type mentioned in the introduction, which is characterized by a particularly lightweight design.

This object is achieved by the convertible top having the features of claim 1.

According to the invention, it is thus proposed that the top element is designed as a plastics composite component which comprises a substrate structure which is integrally formed on an outer skin, which is formed from a textile fabric having a rubber backing.

By designing the top element as a plastics composite component, it is possible to keep the weight down of the top. By attaching the outer skin formed from a textile fabric to the substrate structure and/or integrating the outer skin formed from a textile fabric into the plastics composite component, a secure and reliable attachment of the textile fabric to the top structure is ensured. The rubber backing of the textile fabric prevents the material of the substrate structure passing through to the outside of the outer skin, when the substrate structure is integrally formed on the outer skin.

In a preferred embodiment of the convertible top according to the invention, the textile fabric is formed from a woven fabric which, in particular, consists of polyacrylonitrile. Such a woven fabric is wear-resistant and may be configured to be watertight so that it is able to be used as an outer skin of a convertible top.

A particularly reliable rubber backing preventing the material of the substrate structure from passing through, consists, for example, of chloroprene rubber which is known, in particular, as CR rubber.

The outer skin has a thickness, for example, of between 0.4 mm and 1.0 mm.

In order to provide a particularly lightweight substrate structure, said substrate structure has, for example, a core which on its side remote from the outer skin and on its side facing the outer skin has one respective polyurethane layer. For reinforcing the respective top element, the polyurethane layer may be glass fiber-reinforced. The core consists, for example, of a honeycomb structure, in particular a paper honeycomb. Alternatively, however, the core may also be formed from a hard foam.

In order to ensure a visually attractive attachment of the outer skin to the substrate in the edge region thereof, it is also advantageous if on its edge the outer skin has a folded edge which is adhesively bonded to the substrate.

The convertible top according to the invention may be a hard top, i.e. a so-called RHT (retractable hard top). In this case, the top element generally forms one of a plurality of rigid roof segments of the hard top. By being designed with an outer skin made of a textile fabric, the roof segment provides the appearance of a top cover of a folding top, which is frequently desired.

Alternatively, the convertible top according to the invention may also be a folding top, i.e. a so-called soft top. In this case, the top element which is configured as a plastics composite component and to which the outer skin formed from a textile fabric is attached, may be a cross support of the top linkage, in particular a front support which is also frequently denoted as a roof strut which in the closed position of the top linkage is adjacent to a front cowl of the relevant motor vehicle and is secured thereto by means of a suitable fastening.

Further advantages and advantageous embodiments of the subject of the invention may be derived from the description, the drawings and the claims.

Exemplary embodiments of a convertible top according to the invention are shown schematically in simplified form in the drawings and are described in more detail in the following description. In the drawings:

FIG. 5 shows a longitudinal section through a folding top according to the invention with a foamed-on top fabric and with an inner roof lining;

FIG. 6 shows a view corresponding to FIG. 5 of a further embodiment of a folding top with retaining strips integrated in cross supports; and FIGS. 7-9 show the production of a top element of a top according to the invention.

Figure 1:
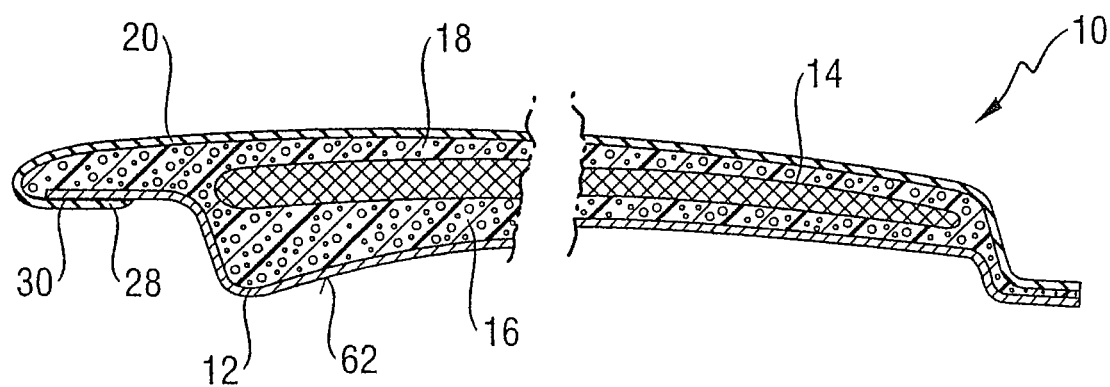
FIG. 1 shows a schematic section through a roof segment of a convertible hard top.

A roof segment 10 of an otherwise not shown convertible top configured as a hard shell roof and/or hard top is shown in FIG. 1, said roof segment comprising in the conventional manner a plurality of substantially rigid roof segments which are mounted on a top linkage, which is able to be moved between a closed position in which the roof segments cover a vehicle interior above, and an open position in which the vehicle interior is upwardly open. The top linkage comprises in each case a link assembly on both sides with respect to a vertical vehicle longitudinal center plane. The roof segment 10 extends between said two link assemblies.

The roof segment 10 is configured as a plastics composite component and comprises a substrate structure 12 which has a core 14 which is formed from a honeycomb structure, in particular a paper honeycomb. The honeycomb structure 14, which is of planar configuration, is defined on both sides by a polyurethane layer 16 and/or 18 which is reinforced by means of a glass-fiber mat, not shown in more detail. In the closed position of the top, the polyurethane layer 16 is arranged at the bottom and faces the vehicle interior. On the other hand, the polyurethane layer 18 is arranged at the top, i.e. on the side of the substrate structure 12 facing the vehicle exterior.

An outer skin 20 is arranged on the outer polyurethane layer 18, said outer skin being formed from a textile fabric with a rubber backing. The rubber backing is directly adjacent to the upper polyurethane layer 18. The woven fabric of the outer skin 20 consists of polyacrylonitrile. The rubber backing of the outer skin 20 is formed from chloroprene rubber. The outer skin 20 has a thickness of approximately 0.8 mm. On the side remote from the outer skin 20, the substrate structure 12 is provided with a roof lining fabric 62.

Figure 2:
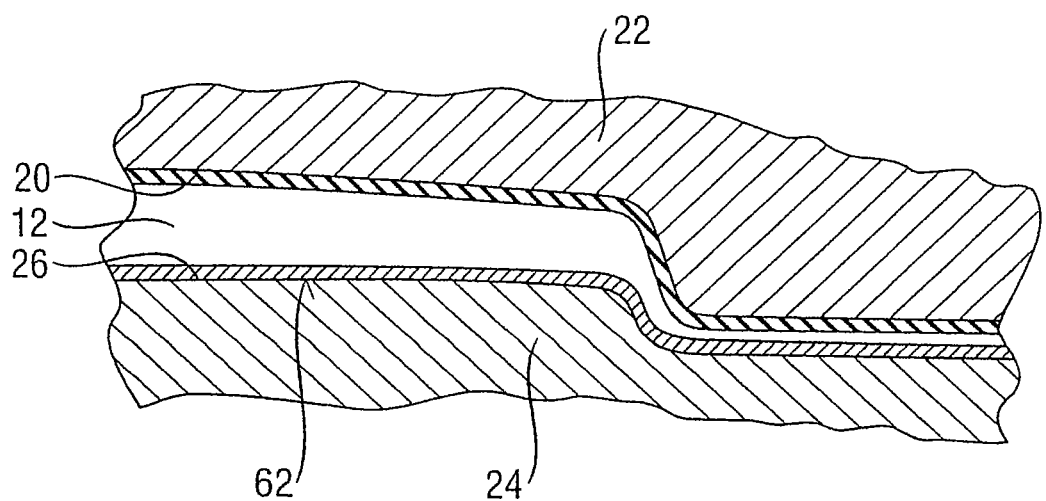
FIG. 2 shows a detailed sectional view of a tool for producing the roof segment according to FIG. 1.

The production of the roof segment 10 takes place in a molding tool, shown in detail in FIG. 2, said molding tool comprising an upper tool 22 and a lower tool 24. When the tool is open, the outer skin 20, which is formed from the textile material comprising the rubber backing, and the roof lining fabric 62 are initially inserted into a mold cavity 26. Subsequently, the paper honeycomb 14 is inserted together with the glass-fiber mats and sprayed with a polyurethane material. To cause the reaction of the polyurethane material, the material tool is then closed, i.e. the upper tool 22 is moved toward the lower tool 24 so that the mold cavity 26 is closed. By the reaction of the polyurethane material and/or by the foaming thereof, the substrate structure 12 is formed and integrally formed on the outer skin 20. The produced composite component formed from the substrate structure 12, the roof lining fabric 62 and the outer skin 20 may then be unmolded.

The unmolded composite component has an outer skin 20, the edge region 28 thereof protruding in the manner of a flap. Said edge region is folded over to form a folded edge after unmolding the composite component and adhesively bonded via an adhesively bonded connection 30 from below to the substrate structure 12 and/or the roof lining fabric 62.

Figure 3:
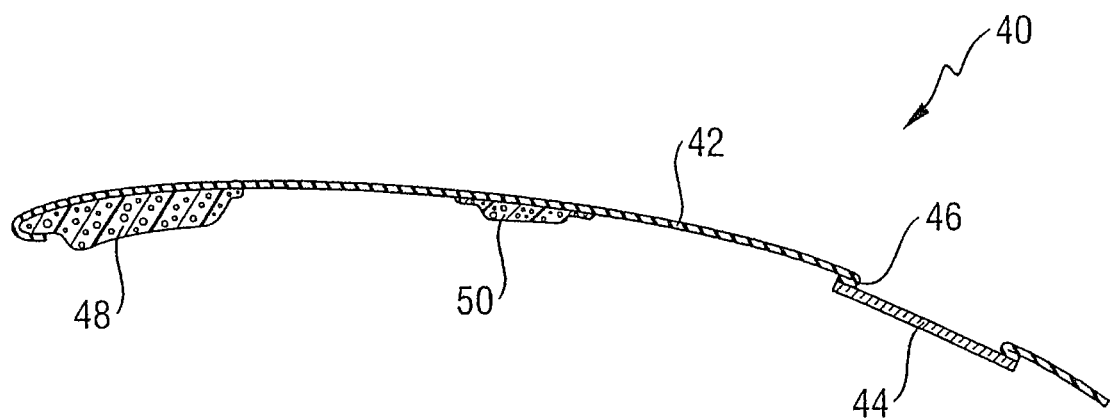
FIG. 3 shows a schematic longitudinal section through a folding top according to the invention.

A longitudinal section of a convertible top 40 is shown in FIG. 3, said convertible top being configured as a folding top and having a top cover and/or top fabric 42 which may be stretched for covering a vehicle interior by means of a top linkage, not shown in more detail. The top fabric 42 is formed from a textile woven fabric made of polyacrylonitrile which is provided with a rubber backing made of chloroprene rubber.

The folding top 40 shown in FIG. 3 also comprises a rear window 44 which is arranged in a cut-out 46 of the top fabric 42, as well as a roof strut 48 configured as a cross support and a central cross support 50 which is arranged between the roof strut 48 and the rear window 44 viewed in the vehicle longitudinal direction.

The roof strut 48 and the cross support 50 are in each case configured as a plastics composite component and comprise a substrate structure which is integrally formed on the top fabric 42, in particular on the rubber backing thereof. The roof strut 48 and the cross support 50 in each case also comprise a core consisting of a paper honeycomb which is arranged between covering layers which in each case are formed from a polyurethane/glass-fiber mixture. The roof strut 48 and the cross support 50 are integrally formed on the top fabric 42 in one respective molding tool and/or foaming tool.

Figure 4:
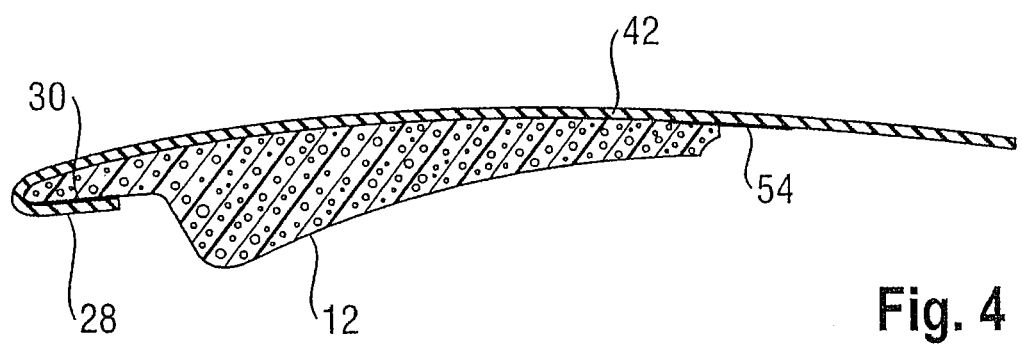
FIG. 4 shows an enlarged view of a region of the top according to FIG. 3 comprising a front support.

As may be derived from FIG. 4, the top fabric 42 of the folding top 40 in its front edge region has a flap 28 folded over to form a folded edge which is connected to the substrate structure 12 made of the plastics composite component via an adhesively bonded connection 30.

Moreover, a separating film 54 is arranged between the substrate structure 12 and the top fabric 42 in the region of the rear edge and/or tailside edge of the substrate structure 12, as a result of which the top fabric 42 may be folded in an optimal manner when the top 40 is stored in a folding top storage compartment.

Figure 8:
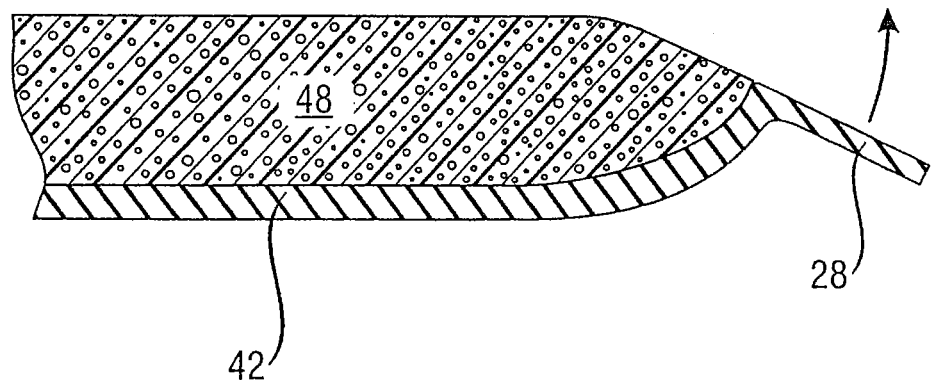
Figure 9:
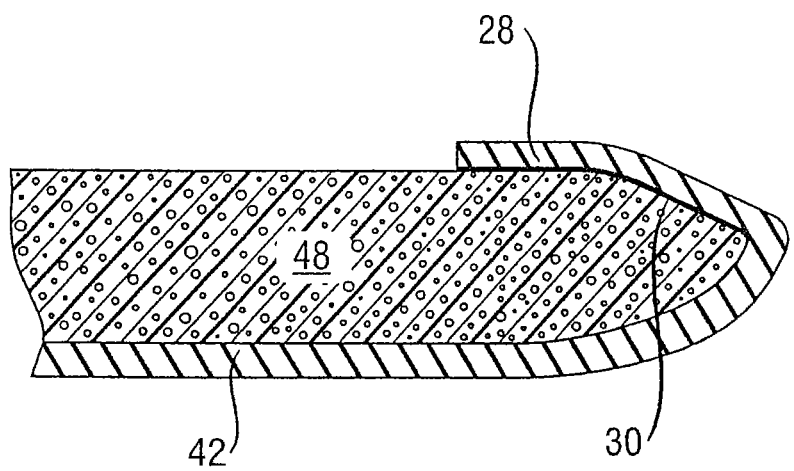

When producing the roof strut 48, shown in FIGS. 7 to 9, the top fabric is inserted into a mold cavity of a molding tool comprising an upper tool 22 and a lower tool 24. In this case, the flap 28 on the edge is retained by means of a separating frame 78 which is associated with a fabric holding-down device 76. The material of the roof strut 48 is then introduced into the mold cavity. After curing, the resulting component may be unmolded and subjected to further processing by means of a milling process. Subsequently, the tab 28 on the edge of the top fabric 42 is folded over to form a folded edge and connected via an adhesively bonded connection 30 to the roof strut 48.

A folding top 60 of a convertible vehicle is shown in FIG. 5, said folding top substantially corresponding to that according to FIG. 4 but differing therefrom in that the roof strut 48 and the cross support 50, in each case on the side thereof facing the vehicle interior in the closed position, bear a roof lining fabric 62 which is foamed-on during the production and/or molding process of the roof strut 48 and/or the cross support 50. In other respects, the folding top 60 corresponds to the folding top according to FIG. 4.

A further folding top 70 is shown in FIG. 6, said folding top also corresponding substantially to the folding top according to FIG. 5 but differing therefrom in that in each case a profile 72 and/or 74 is foamed into the roof strut 48 and the cross support 50, said profile forming a retaining strip for attaching the roof strut 48 and/or the cross support 50 to the top linkage. In other respects, the folding top 70 corresponds to that according to FIG. 5.

The invention claimed is:

1. A convertible top, comprising: a top linkage which is able to be moved between an open position which opens a vehicle interior upward and a closed position which covers the vehicle interior above, and has at least one top element which is at least substantially rigid, wherein the top element is designed as a plastics composite component which comprises a substrate structure which is integrally formed to an outer skin, which is formed from a textile fabric having a rubber backing directly adjacent to the substrate structure, wherein said convertible top is a hard top and in that the top element is a rigid roof segment of the hard top.

2. The convertible top as claimed in claim 1, wherein the textile fabric is formed from a woven fabric which, in particular, consists of polyacrylonitrile.

3. The convertible top as claimed in claim 1 wherein the rubber backing is formed from chloroprene rubber.

4. The convertible top as claimed in claim 1, wherein the outer skin has a thickness of between 0.4 mm and 1.0 mm.

5. The convertible top as claimed in claim 1, wherein the substrate structure has a core which on a first side facing the outer skin and on a second side remote from the outer skin has one respective polyurethane layer which is glass fiber reinforced.

6. The convertible top as claimed in claim 5, wherein the core is formed from a honeycomb structure, in particular a paper honeycomb.

7. The convertible top as claimed in claim 1, wherein on an edge the outer skin has a folded edge which is adhesively bonded to the substrate.

8. A convertible top, comprising: a top linkage which is able to be moved between an open position which opens a vehicle interior upward and a closed position which covers the vehicle interior above, and has at least one top element which is at least substantially rigid, wherein the top element is designed as a plastics composite component which comprises a substrate structure which is integrally formed to an outer skin, which is formed from a textile fabric having a rubber backing directly adjacent to the substrate structure, wherein said convertible top is a folding top and in that the top element is a front cross support of the folding top.

* * * * *